UNITED STATES PATENT OFFICE.

PATRICK O'RORK, OF NORWALK, CONNECTICUT.

IMPROVED COMPOSITION FOR STIFFENING FELT CLOTH.

Specification forming part of Letters Patent No. 55,153, dated May 29, 1866.

*To all whom it may concern:*

Be it known that I, PATRICK O'RORK, of Norwalk, in the county of Fairfield and State of Connecticut, have invented and discovered a new and useful composition of substances to be used in the stiffening of felt cloth and other substances for the manufacture of hats, hat-bodies, bonnets or hats for ladies' wear, and other articles to which it is necessary to impart the quality of stiffness; and I do hereby declare that the following is a full and exact description of said substance or composition so by me discovered.

The nature and character of my discovery or invention consists in combining with a solution of shellac, borax, and water, as now commonly used in the manufacture of articles of the character above mentioned, a quantity of alum, with which solution, after the addition of the alum, the material used or manufactured is saturated, for the purpose of imparting to it the necessary degree of stiffness.

In manufacturing what is known in the trade as "soft hats," and other articles of a like character, I use the materials in the following proportions: shellac, fifty pounds; borax, eight pounds; water, twenty-five gallons; and alum, one ounce, first dissolving the shellac and borax in the water and then adding the alum.

In manufacturing what is known in the trade as "full-stiff hats," and other articles of the like character, I first use the above materials in solution, as above described, and then, without first drying the hats or other articles to be stiffened, I place them in a solution of alum and water of the following proportions—viz., one pound of alum to one barrel of water—allowing them to remain therein about fifteen minutes.

I also use the last-mentioned solution of alum and water in the same manner, in stiffening hats and other articles, where shellac and sal-soda or shellac and ammonia are used instead of shellac and borax.

What I claim as my invention and discovery, and desire to secure by Letters Patent, is—

The union of alum with a solution either of shellac and borax, shellac and sal-soda, or shellac and ammonia, for the purpose of stiffening hats, hat-bodies, hats for ladies' wear, and other articles in which a greater degree of stiffness is required than the material used possesses of itself.

PATRICK × O'RORK.
his mark.

Witnesses:
 JOSEPH F. FOOTE,
 LEVI WARNER, JR.